United States Patent
Iriya et al.

(10) Patent No.: US 6,173,690 B1
(45) Date of Patent: Jan. 16, 2001

(54) IN-CYLINDER DIRECT-INJECTION SPARK-IGNITION ENGINE

(75) Inventors: Yuuichi Iriya; Takashi Aoyama, both of Yokohama; Kazuyoshi Aramaki, Kanagawa, all of (JP)

(73) Assignee: Nissan Motor Co., Ltd., Yokohama (JP)

( * ) Notice: Under 35 U.S.C. 154(b), the term of this patent shall be extended for 0 days.

(21) Appl. No.: 09/296,235

(22) Filed: Apr. 22, 1999

(30) Foreign Application Priority Data

Apr. 22, 1998  (JP) .................................................. 10-111719

(51) Int. Cl.⁷ ................................ F02B 17/00; F02F 3/28
(52) U.S. Cl. .......................... 123/295; 123/298; 123/301; 123/302; 123/305
(58) Field of Search .................................... 123/276, 279, 123/295, 298, 301, 302, 305

(56) References Cited

U.S. PATENT DOCUMENTS

| | | |
|---|---|---|
| 4,920,937 * | 5/1990 | Sasaki et al. ..................... 123/302 X |
| 5,553,588 * | 9/1996 | Gono et al. ........................... 123/276 |
| 5,806,482 * | 9/1998 | Igarashi et al. ...................... 123/295 |

* cited by examiner

Primary Examiner—Tony M. Argenbright
(74) Attorney, Agent, or Firm—Foley & Lardner

(57) ABSTRACT

An in-cylinder direct-injection spark-ignition engine using at least a homogeneous combustion mode and a stratified combustion mode and equipped with a pentroof combustion chamber head having first and second shallow-angled surfaces, comprises intake valves disposed in the first shallow-angled surface, exhaust valves disposed in the second shallow-angled surface. A pair of substantially straight intake ports are formed in the cylinder head. A tumble-and-swirl control valve is disposed in a first intake port of the substantially straight intake ports for adjusting the amount of intake air passing through the first intake port. A piston crown comprises an intake-valve side inclined surface generally parallel to the first shallow-angled surface, an exhaust-valve side inclined surface generally parallel to the second shallow-angled surface, and a piston bowl having an opening of a substantially complete round and arranged in an eccentric position with respect to the outside circle of the upper portion of the piston toward the intake valves. The piston bowl has a deeply-recessed bowl cavity. The deeply-recessed bowl cavity is arranged eccentrically to the opening of the piston bowl toward a second intake port of the substantially straight intake ports.

9 Claims, 7 Drawing Sheets

CONTROL-VALVE OPENING CONTROL DURING STRATIFIED MODE

FUEL PRESSURE CONTROL DURING STRATIFIED MODE

IN-CYLINDER DIRECT-INJECTION SPARK-IGNITION ENGINE

BACKGROUND OF THE INVENTION

1. Field of the Invention

The present invention relates to an in-cylinder direct-injection spark-ignition engine with an electronic concentrated engine control system, employing a variable swirl-and-tumble control mechanism and an electronically-controlled fuel-injection system used to switch between a homogeneous combustion mode using tumble airflow and a stratified combustion mode using swirl airflow.

2. Description of the Prior Art

In recent years, there have been proposed and developed various in-cylinder direct-injection spark-ignition engines in which fuel is injected directly into the engine cylinder. The direct-injection spark-ignition engine uses at least two combustion modes, namely an early injection combustion mode or a homogeneous combustion mode where fuel-injection early in the intake stroke produces a homogeneous air-fuel mixture, and a late injection combustion mode or a stratified combustion mode where late fuel-injection delays the event until the end of the compression stroke to produce a stratified air-fuel mixture. One such cylinder direct-injection spark-ignition engine has been disclosed in Japanese Patent Provisional Publication No. 8-35429. This patent provisional publication teaches the provision of a non-circular piston bowl having a reentrant portion and a pair of intake ports, namely, a straight intake port with a so-called swirl control valve and a helical intake port.

SUMMARY OF THE INVENTION

With such a helical intake port, air flow is controlled from just before intake-port valves so as to strengthen swirl airflow. However, the use of the helical port results in increased airflow resistance against incoming intake-air flow, thus reducing a charging efficiency of intake air (a decrease in induction efficiency at high engine speeds, i.e., a drop in engine performance at full throttle). In contrast to the above, if a direct-injection spark-ignition engine is designed with a pair of straight intake ports, adequate swirl flow cannot be produced, and thus there is a problem of piston-bowl wetting during a stratified combustion mode. As mentioned above, it is desirable to more highly reconcile lean or ultra-lean stratified charge combustion for low fuel consumption and homogeneous charge combustion for high power output. Accordingly, it is an object of the invention to provide a direct-injection spark-ignition engine which avoids the aforementioned disadvantages of the prior art.

In order to accomplish the aforementioned and other objects of the present invention, an in-cylinder direct-injection spark-ignition engine comprises a cylinder block having a cylinder, a piston movable through a stroke in the cylinder, a cylinder head on the piston, a pentroof combustion chamber recessed in a bottom of the cylinder head and having first and second shallow-angled surfaces, a pair of intake valves disposed in the first shallow-angled surface of the pentroof combustion chamber, a pair of exhaust valves disposed in the second shallow-angled surface of the pentroof combustion chamber, a pair of substantially straight intake ports, in which the pair of intake valves operate, formed in the cylinder head, an intake-air control valve disposed in a first intake port of the pair of substantially straight intake ports for adjusting an amount of intake air passing through the first intake port, a spark plug installed in the cylinder head in a substantially center of the cylinder, a fuel injector disposed in the bottom of the cylinder head adjacent to the pair of intake valves so that an axial line of the fuel injector is directed to the substantially center of the cylinder, for injecting fuel directly into the cylinder, and a control unit being configured to be electronically connected to the fuel injector for switching between a homogeneous combustion mode where early fuel-injection on intake stroke produces a homogeneous air-fuel mixture while producing a tumbling action into the cylinder, and a stratified combustion mode where late fuel-injection on compression stroke produces a stratified air-fuel mixture while producing a swirling action into the cylinder, wherein a piston crown of the piston comprises an intake-valve side inclined surface generally parallel to the first shallow-angled surface, an exhaust-valve side inclined surface generally parallel to the second shallow-angled surface, and a piston bowl having an opening of a substantially complete round and arranged in an eccentric position with respect to an outside circle of an upper portion of the piston toward the pair of intake valves, and wherein the piston bowl has a deeply-recessed bowl cavity, and the deeply-recessed bowl cavity is arranged eccentrically to the opening of the piston bowl toward a second intake port of the pair of substantially straight intake ports.

DESCRIPTION OF THE PREFERRED EMBODIMENTS

Figure 1:
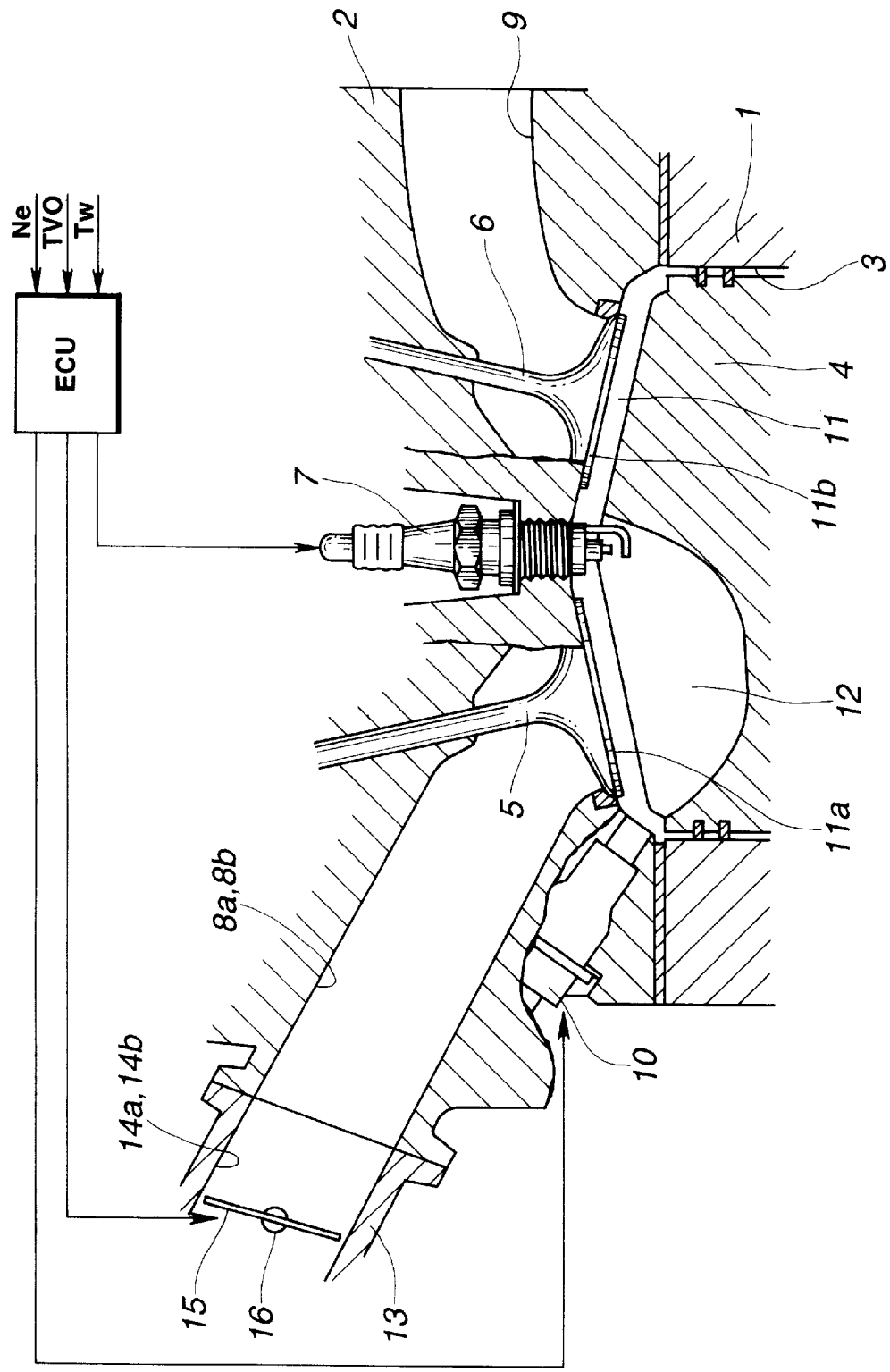
FIG. 1 is a longitudinal cross-sectional view illustrating an embodiment of an in-cylinder direct-injection spark-ignition engine of the invention.
Figure 2:
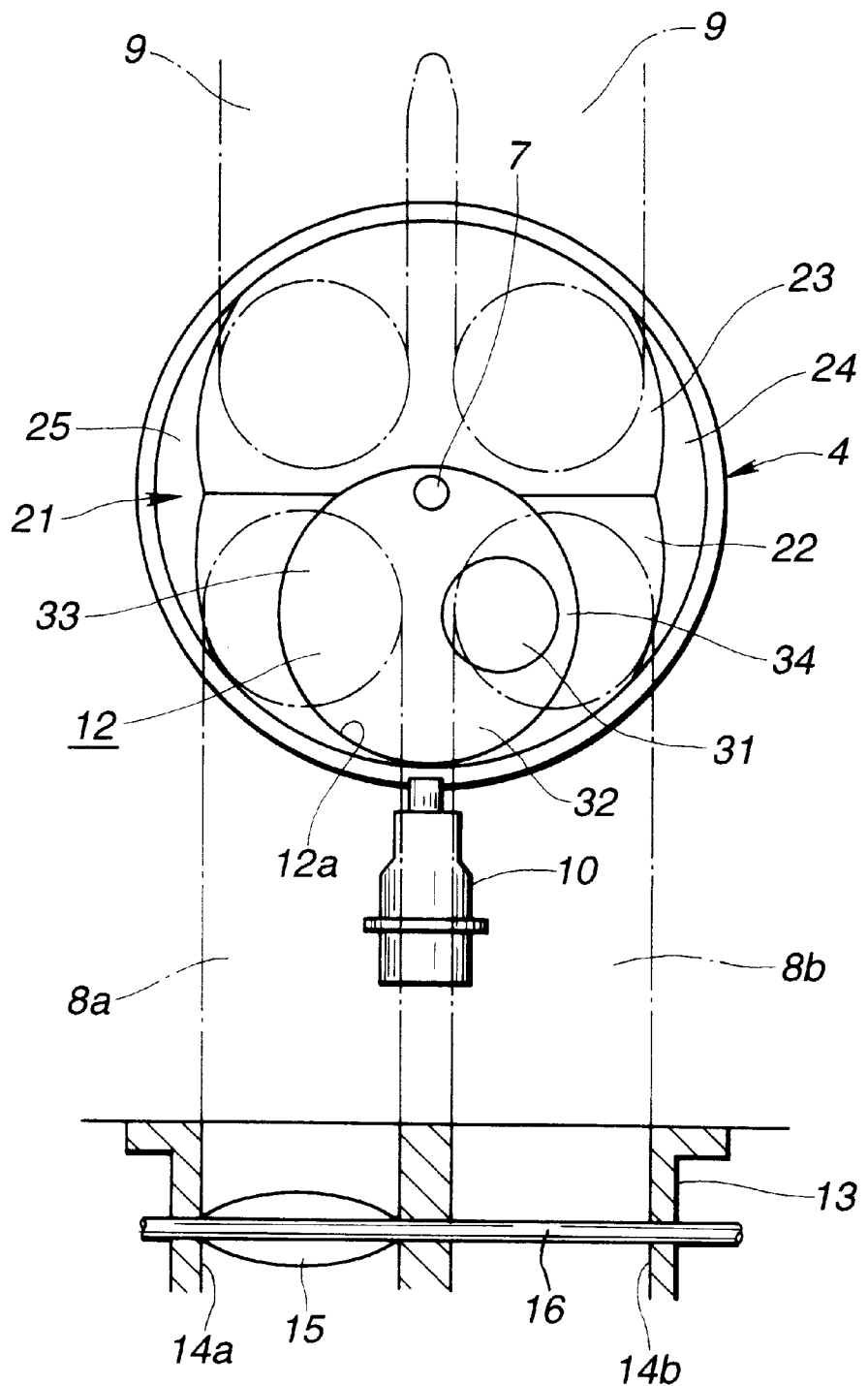
FIG. 2 is a perspective top view of the engine shown in FIG. 1.

Referring now to the drawings, particularly to FIGS. 1 and 2, the in-cylinder direct-injection spark-ignition engine of the invention is exemplified in an in-line overhead-valve engine with a four-valve combustion chamber head. A plurality of engine cylinders 3 are arranged in one line in a cylinder block 1. A cylinder head 2 is mounted on the cylinder block 1 to enclose cylinder bores. A piston 4 is slidably fitted into the cylinder 3, and movable through a stroke in the cylinder. A pentroof combustion chamber 11 is formed or recessed in the bottom of the cylinder head 2 like a shallow angled hemisphere. As viewed from the longitudinal cross section shown in FIG. 1, a pair of intake valves (5, 5) are disposed in the left-hand shallow-angled surface 11a of the pentroof combustion chamber 11, whereas a pair of exhaust valves (6, 6) are disposed in the right-hand shallow-angled surface 11b. As clearly seen in FIGS. 1 and 2 in combination, a spark plug 7 is installed in the cylinder head 2 in the cylinder center position surrounded by the four valves (5, 5, 6, 6). As can be appreciated from the phantom line of FIG. 2, a pair of intake ports 8a and 8b, in which the respective intake valves 5 and 5 operate and through which burned gases pass, are formed in the cylinder head 2 independently of each other. There is no confluent point between the two intake ports 8a and 8b in the cylinder head 2, and thus these two intake ports 8a and 8b open independently into the pent-roof combustion chamber through the bottom face of the cylinder head. On the other hand, a pair of exhaust ports 9 and 9, corresponding to the respective exhaust valves 6 and 6, are joined with each other as one exhaust-gas passage. An electromagnetic fuel injection valve 10 (simply, a fuel injector), which is included in an electronic fuel injection system and formed into a substantially cylindrical shape, is disposed or arranged in the bottom of the cylinder head 2 adjacent to the cylinder wall close to the intake valves (5, 5). As shown in FIG. 1, the axial line of the injector 10 is directed obliquely downwardly within towards the combustion chamber, the detailed structure of which will be fully described later. As best seen in FIG. 2, the injector 10 is located in the bottom of the cylinder head 2 midway between the two intake valves 5 and 5, such that an axial line of fuel spray injected from the injector 10 is directed to penetrate the cylinder central axis on which the spark plug 7 is located. The amount of fuel injected from the injector 10 into the associated cylinder 3 is controlled usually by the pulse-width time (a controlled duty cycle or duty ratio) of a pulsewidth modulated (PWM) voltage signal often called an "injection pulse signal". The output interface of the ECU generates the injection pulse signal on the intake stroke and on the compression stroke, in synchronization with revolutions of the engine. The electromagnetic solenoid of the injector 10 is energized or de-energized by the duty cycle pulsewidth modulated (PWM) voltage signal at a controlled duty cycle. In this manner, the injector opening time can be controlled by way of the controlled duty cycle and also the fuel, automatically regulated to a desired fuel pressure level depending on the engine operating conditions such as engine speed and/or load, can be injected via the fuel injector 10 and then delivered directly into the associated engine cylinder 3. The piston 4 is formed in its top portion with a substantially semi-spherical piston bowl 12, so that the bowl 12 is arranged in the eccentric position with respect to the outside circle of the upper portion of the piston toward the intake valves. The nozzle of the injector 10 is designed so that the fuel-spray axial line of the injector nozzle is directed within towards the piston bowl 12, when the piston 4 is at or nearby top dead center (TDC). These two intake ports 8a and 8b are connected to respective intake-air passages 14a and 14b, formed in an intake manifold 13 of the induction system independently of each other. An intake-air control valve 15 is provided in the intake-air passage 14a communicating the first intake port 8a (the left-hand intake port in FIG. 2). In the shown embodiment, the intake-air control valve 15 comprises a butterfly valve (see the left-hand side of FIG. 1) consisting of hinged two half discs, opening and closing only one (14a) of the two intake-air passages (14a, 14b). The opening and closing of the intake-air control valve 15 is electronically automatically controlled depending upon engine operating conditions, via a driving mechanism or an actuator, such as a stepper motor also known as a "stepping motor" or a "step-servo motor", by means of the ECU. A valve shaft 16 of the intake-air control valve 15 is included in the actuator for the intake-air control valve 15. Actually, the actuator is mechanically linked to the intake-air control valve 15 and also the actuator (or the stepper motor) of the control valve 15 is electronically connected via a signal line to the output interface of the ECU, so that the operating amount of the actuator or the angular steps of the stepper motor can be obtained electromagnetically depending upon the control signal (or the drive signal) from the output interface of the ECU. As discussed above, the opening of the intake-valve control valve 15, i.e., the flow rate of intake air entering each intake-valve port (8a, 8b) can be electronically controlled in response to the control signal from the ECU, irrespective of depression of the accelerator pedal. With the intake-air control valve 15 fully closed, intake-air flow towards the first intake port 8a is blocked, thus permitting fresh air to flow through only the second intake port 8b (the right-hand intake port in FIG. 2), communicating the other intake-air passage 14b. In the embodiment, note that the second intake port 8b is not formed as a helical port. The second intake port 8b has an essentially straight port structure. Likewise, the first intake port 8a has an essentially straight port structure. That is, each of the first and second intake ports 8a and 8b comprises a so-called "aerodynamic straight intake port".

The fundamental operation of the above-mentioned internal combustion engine is described hereunder.

During high-load operation (when accelerating, or during full throttle), or in a lean-burn zone or a lean-combustion zone of a comparatively small air-fuel mixture ratio (AFR or A/F), an electronic/engine control module (ECM) or an electronic control unit (ECU) selects a homogeneous combustion mode where fuel-injection early in the intake stroke produces a homogeneous air-fuel mixture suitable for high-load conditions, while producing a tumbling action into the combustion chamber (or the cylinder). During the homogeneous combustion mode, the previously-noted intake-air control valve 15 is shifted to its valve-open state. Fresh air can be introduced through both the aerodynamic straight intake ports 8a and 8b into the engine cylinder 3. The two straight ports cooperate with the piston crown of the piston 4 to create a strong tumble airflow (strong vertical vortex) within the cylinder 3. Such a tumbling action enhanced by the two straight intake ports (8a, 8b) and the early injection in the intake stroke enable the fuel spray to be positively diffused within the combustion chamber (or the engine cylinder). Therefore, such strong tumble flow promotes homogenization of the air-fuel mixture (more uniformly mixing of the fuel spray with the air charge), avoiding piston-bowl wetting. As discussed above, each of the two intake ports (8a, 8b) is formed as an aerodynamic straight intake port having a small airflow resistance, thus ensuring an increased induction efficiency and an enhanced engine performance at full throttle. In contrast to the above, during partial loads, or during light-load operation, and in a lean-burn or ultra-lean-burn zone of a comparatively great air-fuel mixture ratio, the electronic control unit ECU (described later) selects a stratified combustion mode where late fuel-injection delays the event until the latter half of the compression stroke to produce a stratified air-fuel mixture for part-load, while producing a swirling action into the combustion chamber (or the cylinder). During the stratified combustion mode, the incoming air mixes with the denser fuel spray due to the late injection in the latter half of the compression stroke, to create a rich mixture around the spark plug 7 for easy ignition, while the rest of the air-fuel mixture after later injection is very lean at edges of the combustion chamber. The spark-plug 7, included in an electronic ignition system computer-controlled, is responsive to an ignition signal from the ECU, for igniting the air-fuel mixture to ensure the homogeneous charge combustion on the intake stroke and to ensure the stratified charge combustion in the latter half of the compression stroke. During the stratified combustion mode, the intake-air control valve 15 is held at its fully valve-closed position, in such a manner as to permit the incoming air flow through only the second straight intake port 8b into the cylinder 3. As a result, an airflow component of tumble flow occurring in the cylinder is relatively weakened, and in lieu thereof a strong swirl airflow component S1 (see a relatively large counter-clockwise arrow indicated in FIG. 5) is created. Thus, the intake-air control valve 15 will be referred to as a "swirl-and-tumble control valve", and the actuator for the control valve 15 will be referred to as a "swirl-and-tumble control actuator". In the embodiment, the combustion modes are classified into a homogeneous combustion mode and a stratified combustion mode. If the air/fuel ratio (AFR or A/F) is taken into account, the homogeneous combustion modes are further classified into a homogeneous stoichiometric combustion mode and a homogeneous lean combustion mode. Herein, the air/fuel ratio (AFR) of the homogeneous stoichiometric combustion mode is 14.6:1 AFR. The air/fuel ratio of the homogeneous lean combustion mode is 20:1 to 30:1 AFR (preferably 15:1 to 22:1 AFR). The air/fuel ratio of the stratified combustion mode (exactly the lean stratified combustion mode or the ultra-lean stratified combustion mode) is 25:1 to 50:1 AFR (preferably 40:1 AFR). During the stratified combustion mode (that is, during the lean stratified combustion mode or the ultra-lean stratified combustion mode), the fuel spray is injected from the injector nozzle within towards the piston bowl 12 in the latter half of the combustion stroke. The fuel spray, injected or sprayed out from the injector nozzle in the latter half of the compression stroke, is first trapped in the piston bowl 12 formed in the top portion (the piston crown) of the piston 4, and then carried toward a pair of electrodes of the spark plug 7 by virtue of in-piston-bowl swirl flow or in-bowl swirl flow S2 (see a relatively small counter-clockwise arrow indicated in FIG. 5) temporarily trapped in the piston bowl 12 on the compression stroke, and as a consequence the ignitable rich air-fuel mixture is concentrated in the center of the compressed air-fuel mixture around the spark plug 7. When a spark is produced at the spark-plug gap in response to a controlled ignition timing, the combustion takes place largely in and around the concentration of rich mixture, and then the burning rich mixture spreads into areas where the air-fuel mixture is lean and harder to ignite. As set out above, the lean stratified combustion or ultra-lean stratified combustion is attained.

Figure 3:
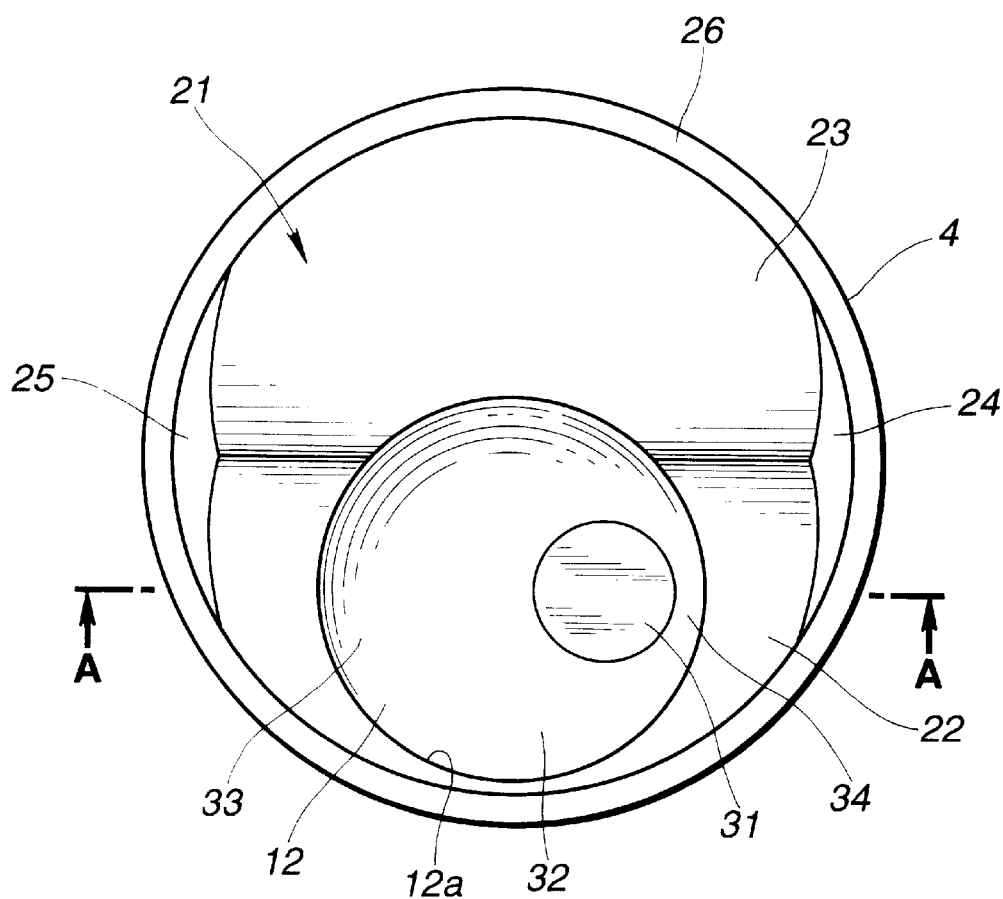
FIG. 3 is a plan view illustrating a unique piston bowl of a reentrant-bowl piston employed in the engine shown in FIG. 1.
Figure 4:
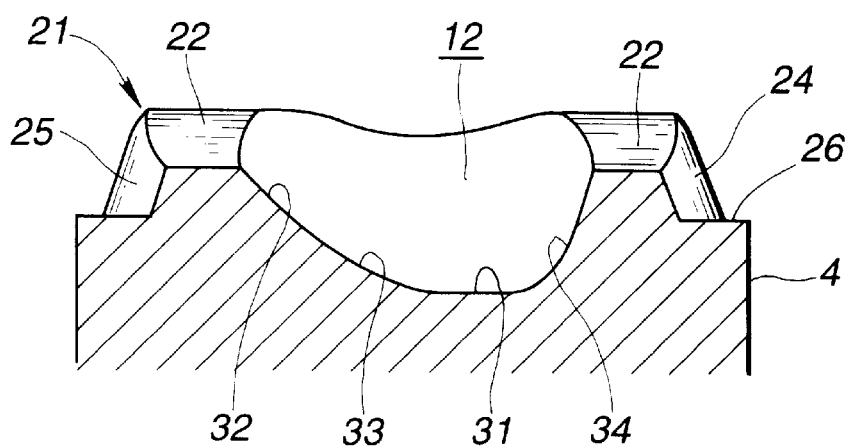
FIG. 4 is a cross section taken along the line A—A of FIG. 3.
Figure 5:
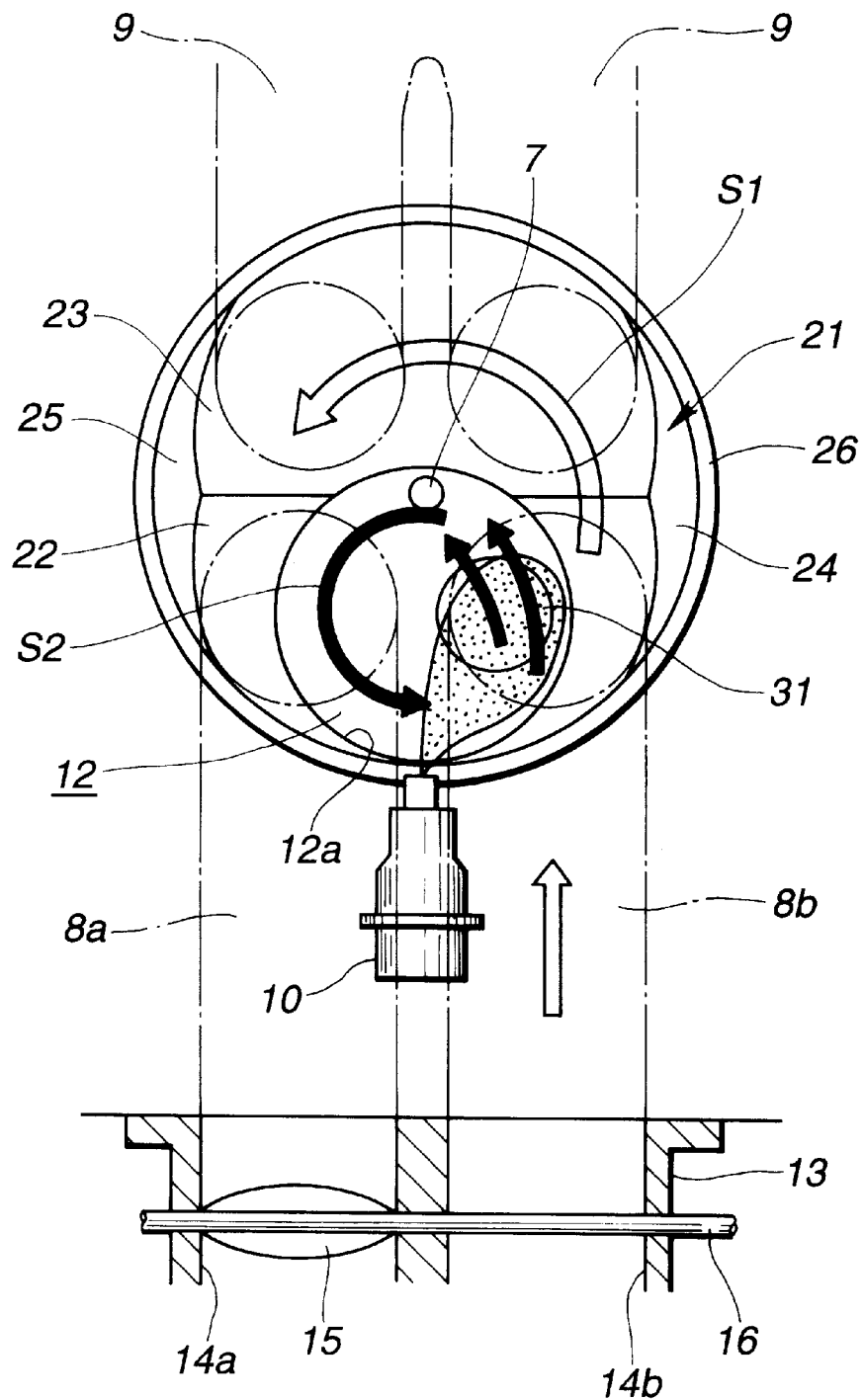
FIG. 5 is an explanatory view illustrating various swirl flows (S1, S2) within just after injection.

Details of the structure of the piston 4, particularly the structure and shape of the top portion (the piston crown) of the piston are hereunder described by reference to FIGS. 3, 4, 5, and 6A–6C. As best seen in FIGS. 3 and 4:, the piston 4 has a raised portion 21 slightly raised at its top portion, so that the piston bowl 12 amounts to a great part of an internal space in the cylinder 3 at the top dead center (TDC). The raised portion 21 of the top portion of the piston 4 is basically comprised of an intake-valve side flat inclined surface 22 generally parallel to the intake-valve side shallow-angled surface 11a constructing part of the pentroof combustion chamber 11 formed in the bottom of the cylinder head 2, an exhaust-valve side flat inclined surface 23 generally parallel to the exhaust-valve side shallow-angled surface 11b constructing part of the pentroof combustion chamber 11, and a pair of curved side walls 24 and 25 constructing a portion of a curved surface closer to the base of a cone concentric to the outside circle of the top portion of the piston 4. As can be seen in FIGS. 3 and 4, the vertical angle (or the apex angle) of the vertex of a right circular cone hypothetically defined by the two curved side walls 24 and 25 is comparatively small, and thus sharply edged or steeply risen. As shown in FIG. 3, the ridge of the raised portion 21 extends up close to the outside circle of the top portion of the piston 4 in the piston-pin direction. At TDC, there is an excessively small clearance between the curved side wall pair (24, 25) and the pentroof combustion chamber 11 formed in the cylinder head 2, and as a result the piston bowl 12 amounts to the majority of volumetric capacity of the internal space present in the cylinder 3 at the end of the compression stroke. The circumference of the previously-noted raised portion 21 is formed as an annular horizontal surface 26. The annular horizontal surface 26 is flat and constructs a part of a plane perpendicular to the axis of the piston 4. The annular horizontal surface 26 has a small radial width and is formed on the top portion of the piston 4 annularly continually all around the circumference of the piston. A major portion of the piston bowl 12 is formed or recessed within the intake-valve side flat inclined surface 22, whereas a minor portion of the piston bowl 12 is formed or recessed close to the ridge of the raised portion 21 within the exhaust-valve side flat inclined surface 23. As view from the plan view of the piston 4 shown in FIG. 3, the opening 12a of the piston bowl 12 is formed into a complete round (or a complete circle) and has a diameter slightly greater than a radius of the top portion of the piston 4. A portion of the opening 12a of the piston bowl 12 extends up to part of the exhaust-valve side inclined surface 23 closer to the ridge of the raised portion 21. As seen in FIGS. 1 and 5, the electrodes of the spark plug 7 enter the piston bowl 12 and are located near the minor portion of the bowl 12, when the piston reaches the TDC. As seen in FIGS. 2 and 3, the center of a deeply-recessed bowl cavity 31 of the piston bowl 12 is eccentric rightwards (toward the second intake port 8b without an intake-air control valve) from the center of the opening 12a of the piston bowl 12. The deeply-recessed bowl cavity 31 is formed in the raised portion 21 in such a manner as to extend along a plane perpendicular to the axis of the piston 4. Additionally, the deeply-recessed bowl cavity 31 is formed into a substantially complete round less than the complete round of the piston-bowl opening 12a. The deeply-recessed bowl cavity 31 is arranged within an inside curved surface area 34 located in the upstream side of the in-bowl swirl flow S2 with respect to the spark plug 7. The deeply-recessed bowl cavity 31 is arranged coaxially with respect to the axial line of the piston-bowl opening 12a, in the piston-pin direction (as viewed from the line A—A of FIG. 3). In other words, as seen in FIG. 5, the deeply-recessed bowl cavity 31 is formed in a direction of a stream of fuel spray injected on the compression stroke. As previously described, the axial line of fuel spray injected from the injector 10 is directed toward the spark plug 7 (see FIG. 2). However, the actual stream line of the fuel spray is slightly curved rightwards (viewing FIG. 5) by means of the in-bowl swirl flow S2, with the result that the stream line of the fuel spray injected is directed toward the deeply-recessed bowl cavity 31 formed in the upstream inside curved surface area 34 located in a side of the second intake port 8b. The deeply-recessed bowl cavity 31 is continuous with an inside curved wall portion 32 of the piston bowl 12. The ridge line of the piston-bowl opening 12a and the deeply-recessed bowl cavity 31 are interconnected through the inside curved wall portion 32. Although the ridge line of the deeply-recessed bowl cavity 31 is clearly shown in FIG. 3, actually the deeply-recessed bowl cavity 31 is smoothly continuous with the inside curved wall portion 32. That is, the piston bowl 12, constructed by the inside curved wall portion 32 and the deeply-recessed bowl cavity 31, is formed as a continuous series of curved wall surface (see FIG. 4). Therefore, there is no ridge line between the deeply-recessed bowl cavity 31 and the inside curved wall portion 32. Furthermore, the deeply-recessed bowl cavity 31 is somewhat eccentric to the second intake port 8*b*, and thus the radius-of-curvature of a downstream inside curved surface area 33 located in a side of the first intake port 8*a* is greater than the radius-of-curvature of the upstream inside curved area 34 located in a side of the second intake port 8*b*. In other words, the curvature of the downstream inside curved surface area 33 is less than the curvature of the upstream inside curved surface area 34, since a curvature-of-radius is defined as an inverse number of a curvature. That is, the downstream inside curved surface area 33, located in the downstream side of the in-bowl swirl flow S2 with respect to the spark plug 7, has a comparatively gently-curved concave wall surface, whereas the upstream inside curved surface area 34, located in the upstream side of the in-bowl swirl flow S2 with respect to the spark plug 7, has a comparatively steeply-curved concave wall surface. The downstream inside curved surface area 33 widely extends from within the right-hand inside curved surface zone of the piston bowl 12 up close to the deeply-recessed bowl cavity 31 in the form of the gently-curved concave wall surface, whereas the upstream inside curved surface area 34 locally extends from within the left-hand inside curved surface zone of the piston bowl 12 up close to the deeply-recessed bowl cavity 31 in the form of the steeply-curved concave wall surface.

Figure 6:
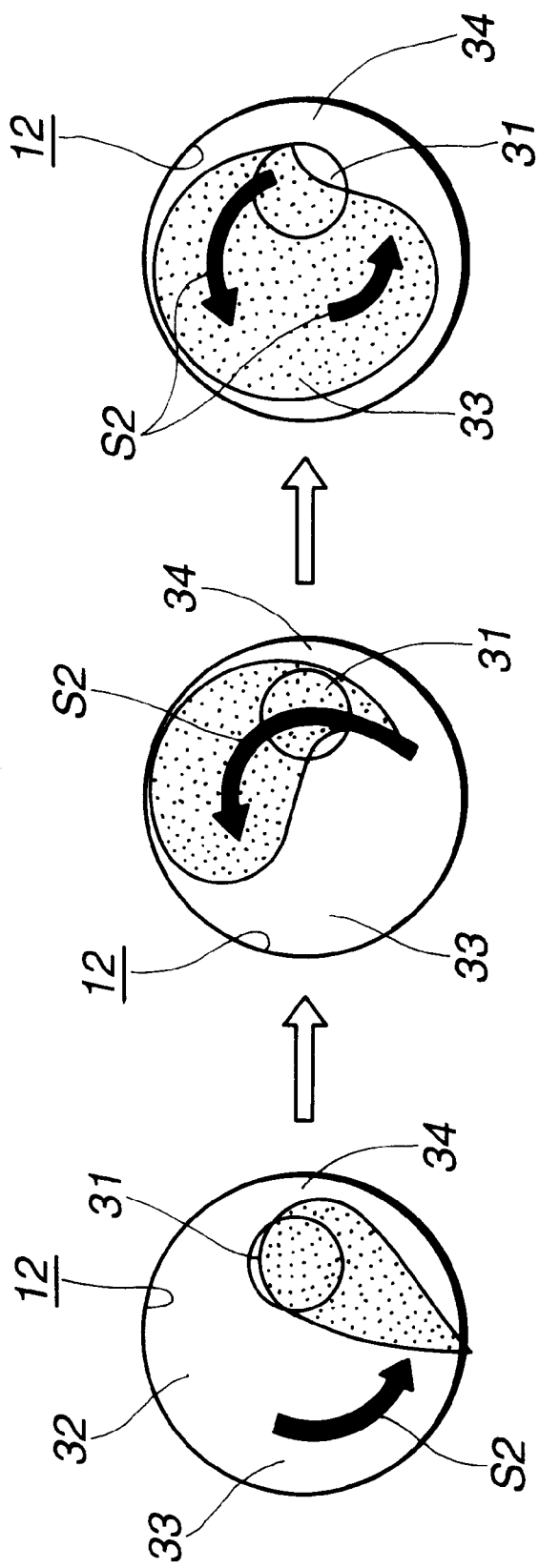
FIGS. 6A, 6B and 6C are explanatory views illustrating a series of behavior of fuel spray injected into the pent-roof combustion chamber of the engine of the embodiment.

With the previously-noted piston-crown structure, as best seen in FIG. 5, the strong swirl flow S1, created in the cylinder 3 with the intake-air control valve 15 fully closed during the stratified combustion mode, is effectively smoothly guided within the piston bowl 12 of a complete round, according to upward motion of the piston 4 on the compression stroke, and thus the powerful swirl flow is sustained within the piston bowl 12. When the piston 4 approaches close to the TDC according to further upward motion after fuel spray is injected from the injector 10 within towards the piston bowl 12 at the latter half of the compression stroke, the intake-valve side flat inclined surface 22 and the exhaust-valve side flat inclined surface 23 approach close to the respective shallow-angled surfaces 11*a* and 11*b* of the bottom of the cylinder head 2. This provides a better gas-tight seal all around the opening 12*a* of the piston bowl 12, thereby preventing the air-fuel mixture and the in-bowl swirl flow S2 introduced into the piston bowl 12 from leaking out of the bowl 12. Thus, the combustion progresses within the piston bowl 12. Herein, the fuel spray, injected from the injector 10 within towards the piston bowl 12, is slightly curved rightwards (see FIGS. 5 and 6A) by virtue of the in-bowl swirl flow S2, while being guided by the inside curved wall portion 32, and then directed toward the deeply-recessed bowl cavity 31. As seen in FIG. 6B, the fuel spray is further carried to the vicinity of the spark plug 7 by the in-bowl swirl flow S2, properly vaporizing. As a result, the ignitable rich air-fuel mixture is concentrated in the center of the compressed air-fuel mixture around the spark plug 7. As set forth above, in the in-cylinder direct-injection spark-ignition engine of the embodiment, fuel spray can be directed within towards the deeply-recessed bowl cavity 31 of the piston bowl 12, utilizing the unique bowl shape and dimensions and the in-bowl swirl flow S2. Thus, the distance of impingement of the fuel spray on the piston crown of the piston 4 (abbreviated to "spray/piston-crown impingement distance") becomes relatively great. The increased spray/piston-crown impingement distance increases the time for fuel vaporization and mixing with the air charge, and thus avoiding or suppressing undesirable formation of fuel film adhered onto the piston bowl 12. This suppresses smoke formation and reduces deposits of sooty carbon on the insulator of the spark plug 7 around the center electrode. Additionally, as described above, the piston bowl 12 is formed as a continuous series of curved wall surface, composed of the deeply-recessed bowl cavity 31 and the inside curved wall portion 32, and thus there is no ridge line between the deeply-recessed bowl cavity 31 and the inside curved wall portion 32. The deeply-recessed bowl cavity 31 is smoothly continuous with the inner peripheral portion of the inside curved wall portion 32. This reduces deposits of unburned fuel (hydrocarbon) in and around the deeply-recessed bowl cavity 31. As seen in FIGS. 6B and 6C, the air-fuel mixture, passing through the spark plug 7, is effectively diffused toward the downstream inside curved surface area 33 (viewing FIGS. 6B and 6C) by virtue of the in-bowl swirl flow S2. Thus, assuming that fuel spray, remaining in a liquid state, is adhered onto the deeply-recessed bowl cavity 31 or the upstream inside curved surface area 34 located in a side of the second intake port 8*b*, such an adhered fuel film is rapidly thinned and efficiently vaporized, while the air-fuel mixture is diffused toward the downstream inside curved surface area 33 (see FIGS. 6B and 6C). In order to certainly direct the fuel spray injected from the injector 10 toward the deeply-recessed bowl cavity 31, and also from the viewpoint of in-cylinder gas/spray interactions, wall wetting, fuel vaporization, and various spray characteristics such as spray penetration, spray/wall impingement, spray/piston-crown impingement, and air/fuel mixing, it is important to properly variably control an opening of the intake-air control valve 15 and a fuel pressure of the injector 10, depending on the engine operating conditions. The intake-air control valve opening and the fuel pressure are both electronically controlled by means of the ECU shown in FIG. 1. The electronic control unit (ECU) comprises a microcomputer, generally constructed by a central processing unit (CPU), a read only memory (ROM), a random access memory (RAM), an analog-to-digital converter, an input/output interface circuitry or an input/output interface unit, and the like. As shown in FIG. 1, the input interface of the ECU receives various signals from engine/vehicle sensors, namely an engine-speed sensor, an engine load sensor, and a coolant temperature sensor. Usually, a crank angle sensor is used as the engine speed sensor for detecting engine speed. Actually, the crank angle sensor detects revolutions of the engine crankshaft or the rotation of the camshaft. Assuming that the number of engine cylinders is "n", the crank angle sensor generates a reference pulse signal 18*a* predetermined crank angle for every crank angle 720°/n, and at the same time generates a unit pulse signal (1° signal or 2° signal) for every unit crank angle (1° or 2°). The central processing unit (CPU) of the ECU arithmetically calculates engine speed Ne for example on the basis of the period of the reference pulse signal from the crank angle sensor. A throttle sensor is often used as the engine load sensor for detecting engine load. The throttle sensor is usually located near an electronically-controlled throttle (not shown) to generate a throttle sensor signal indicative of a throttle opening TVO, which is generally defined as a ratio of an actual throttle angle to a throttle angle obtained at wide open throttle. The throttle sensor involves an idle switch (not numbered), which is switched ON with the electronically-controlled throttle fully closed. In lieu of the throttle sensor, an accelerator pedal position sensor may be used as the engine load sensor. The accelerator position sensor is located near the accelerator pedal to detect an accelerator opening, that is, a depression amount of the accelerator pedal. The coolant temperature sensor is located on the engine (for example on the cylinder block 1) to sense the actual operating temperature (coolant temperature Tw) of the engine. Although it is not clearly shown in the drawing, the input interface of the ECU also receives a signal from an exhaust gas oxygen sensor ($O_2$ sensor) in a conventional manner. The $O_2$ sensor is usually located in the exhaust passage, so as to monitor the percentage of oxygen contained within the exhaust gases at all times when the engine is running, and to produce input information indicative of how far the actual air-fuel ratio (A/F) deviates from the closed-loop stoichiometric air-fuel ratio (12.6:1). During the closed-loop engine operating mode where the exhaust temperature has risen to within a predetermined temperature range, the voltage signal from the $O_2$ sensor is used by the ECU. As is generally known, a voltage level of the voltage signal from the $O_2$ sensor is different depending on the oxygen content, that is, high oxygen or low oxygen in the engine exhaust gases. In case of lean air-fuel mixture or high oxygen concentration, the $O_2$ sensor generates a low voltage signal. Conversely, in case of rich air-fuel mixture or low oxygen concentration, the $O_2$ sensor generates a high voltage signal. The air/fuel mixture ratio (A/F) is electronically controlled so that the actual A/F is adjusted to a desired air/fuel mixture ratio. Based on various engine/vehicle sensor signals Ne, TVO, Tw, and a voltage signal from the $O_2$ sensor, the ECU executes predetermined or preprogrammed arithmetic calculations to achieve various tasks, namely a throttle opening control via the electronically-controlled throttle, an exhaust-gas-recirculation (EGR) valve opening control (EGR control) via an EGR control valve, a fuel-injection amount control and a fuel-injection timing control (IT control) via the electromagnetic solenoid of the fuel injector 10 in the electronic fuel-injection system, an ignition timing control (ADV control) via the spark plug 7 in the electronic ignition system, a valve opening control via the electronically-controlled intake-air control valve 15, and a fuel-pressure control via the electronic fuel-injection system involving the fuel injector 10. The ECU, which is electronically connected to the in-cylinder direct-injection spark-ignition engine of the embodiment, performs the arithmetic calculations or arithmetic processing as shown in the flow chart of FIG. 7. Hereinafter described in detail in accordance with the flow chart shown in FIG. 7 is the arithmetic processing executed by the CPU of the microcomputer incorporated in the ECU.

Figure 7:
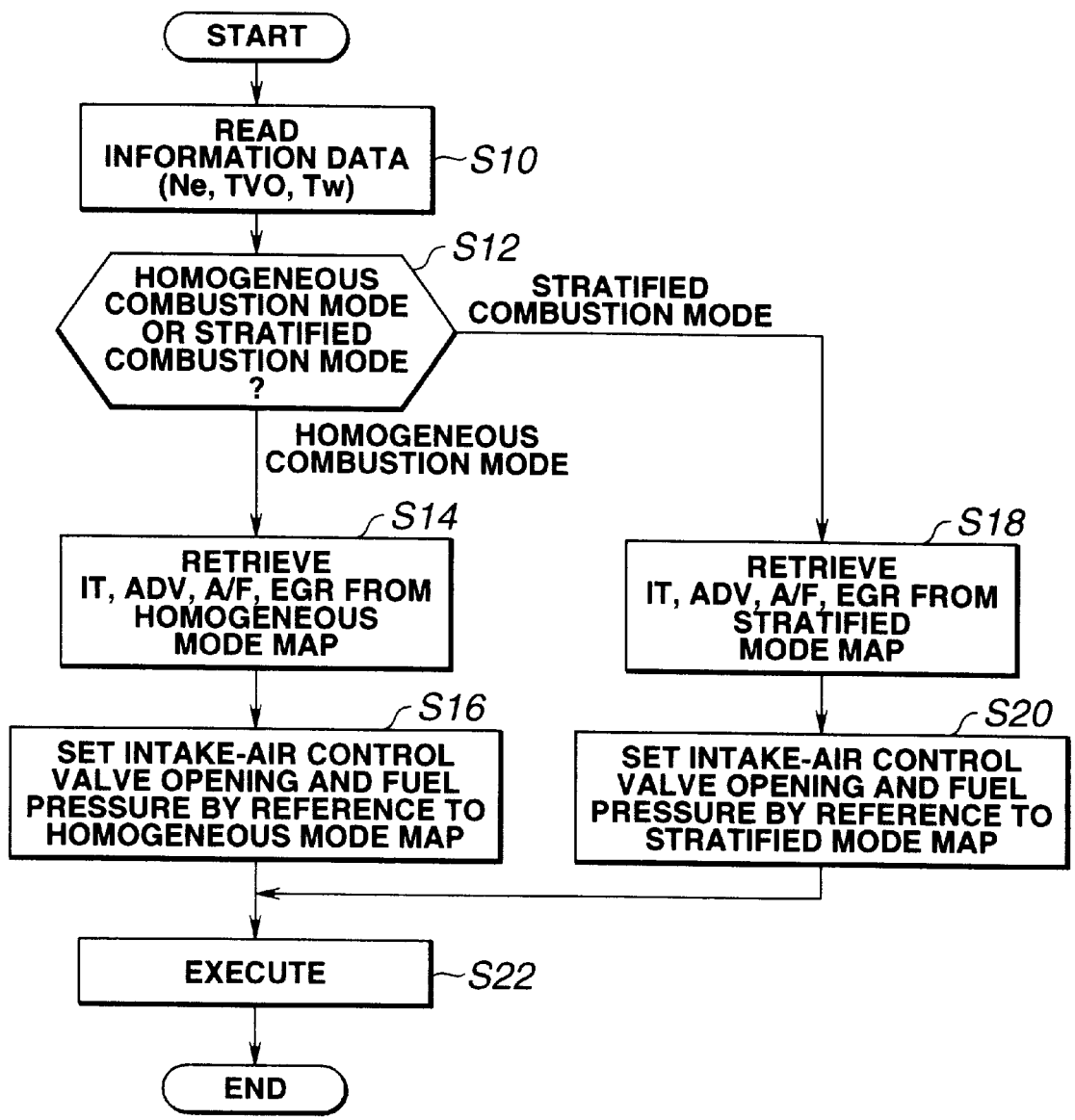
FIG. 7 is a flow chart showing a control routine for both an intake-air control valve opening and a fuel pressure.

The arithmetic processing or the control routine shown in FIG. 7 is executed as time-triggered interrupt routines to be triggered every predetermined intervals such as 10 msec.

Figure 8:
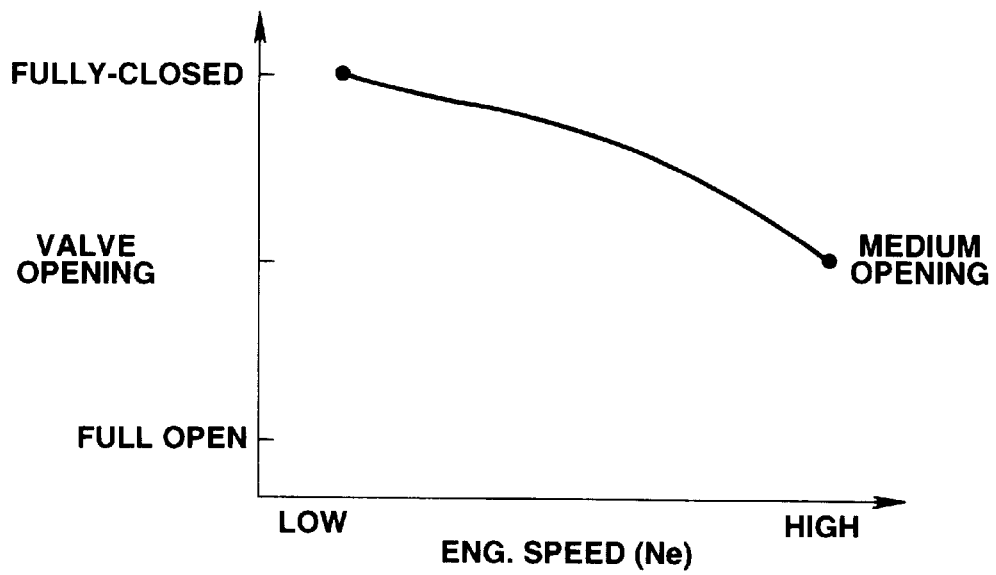
FIG. 8 is a characteristic map illustrating the relationship between engine speed (Ne) and intake-air flow control valve opening during a stratified combustion mode.
Figure 9:
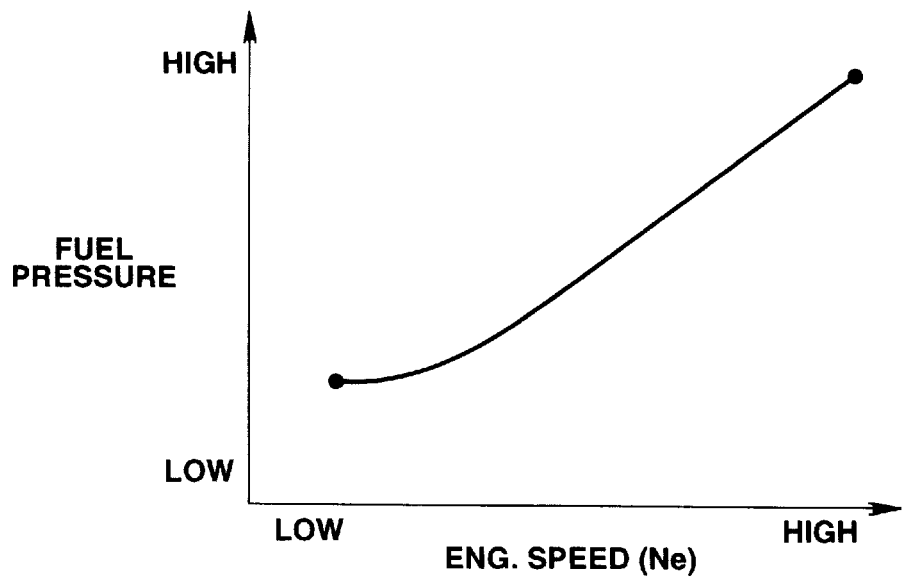
FIG. 9 is a characteristic map illustrating the relationship between engine speed (Ne) and fuel pressure.

In step S10, informational data representative of a current engine operating condition, namely the engine speed Ne, the engine load TVO, and the engine temperature Tw, are read. In step S12, on the basis of the informational data (Ne, TVO, Tw), a test is made to determine whether the current combustion mode is a stratified combustion mode or a homogeneous combustion mode. When the homogeneous combustion mode is selected or executed, the procedure flows to step S14. In step S14, the injection timing (IT), the ignition timing (ADV), the air/fuel mixture ratio (A/F), and the exhaust-gas-recirculation rate (EGR) are set or determined by reference to a predetermined or preprogrammed homogeneous mode map representative of the relationship among the engine speed, the engine load, and the desired combustion mode. A plurality of homogeneous mode maps are preprogrammed for each engine speed and/or for each engine load. To enhance the accuracy in controlling the combustion, more preferably, a plurality of homogeneous mode maps may be preprogrammed for each engine speed, for each engine load, for each coolant temperature, and for the elapsed time from engine starting. These homogeneous mode maps are stored in predetermined memory addresses of the ECU. Thereafter, in step S16, the opening of the intake-air control valve 15 and the fuel pressure of the injector 10 are set or determined by reference to the aforementioned preprogrammed homogeneous mode map. Subsequently to the above, in step S22, by means of the output interface of the ECU, output data (IT, ADV, A/F, EGR, the intake-air control valve opening, and the fuel pressure) are reconverted into drive signals required to operate electrical loads, such as electromagnetic solenoids of the fuel injectors 10, the spark plug 7, a stepper motor of the EGR control valve, a stepper motor of the electronically-controlled throttle, and a swirl-and-tumble control actuator (such as a stepper motor) of the intake-air control valve 15. In this manner, on the basis of the output data determined through steps S14 and S16, electronic fuel-injection control and electronic spark control are executed in step S22. In contrast, when the ECU determines that the current combustion mode is a stratified combustion mode, the procedure flows from step S12 to step S18. In step S18, the injection timing (IT), the ignition timing (ADV), the air/fuel mixture ratio (A/F), and the exhaust-gas-recirculation rate (EGR) are set or determined by reference to a preprogrammed stratified mode map different from the previously-discussed preprogrammed homogeneous mode map. A plurality of stratified mode maps are preprogrammed for each engine speed and/or for each engine load, and stored in predetermined memory addresses. To enhance the accuracy in controlling the combustion, more preferably, a plurality of stratified mode maps may be preprogrammed for each engine speed, for each engine load, for each coolant temperature, and for the elapsed time from engine starting. Then, in step S20, similarly, the opening of the swirl-and-tumble control valve 15 and the fuel pressure of the injector 10 are set or determined by reference to the preprogrammed stratified mode map. FIGS. 8 and 9 respectively show an example of an engine-speed versus intake-air control valve opening characteristic map, and an example of an engine-speed versus fuel-pressure characteristic map, whose maps are used during the stratified combustion mode. As seen in FIG. 8, as the engine speed Ne increases, the opening of the intake-air control valve (or the swirl-and-tumble control valve) 15 gradually shifts from a fully-closed state to a medium opening (a half-open state). On the other hand, as seen in FIG. 9, as the engine speed Ne increases, the fuel pressure gradually rises to a high pressure level. In the in-cylinder direct-injection spark-ignition engine of the shown embodiment, fuel spray injected from the injector 10 is able to be more certainly directed within towards the deeply-recessed bowl cavity 31 of the piston bowl 12, by properly precisely regulating or controlling both the opening of the swirl-and-tumble control valve 15 and the fuel pressure of the injector 10 depending on the engine speed and/or load. Therefore, the engine of the embodiment is capable of achieving stable stratified combustion at all times when the engine/vehicle is running.

The entire contents of Japanese Patent Application No. P10-111719 (filed Apr. 22, 1998) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An in-cylinder direct-injection spark-ignition engine comprising:

a cylinder block having a cylinder;

a piston movable through a stroke in the cylinder;

a cylinder head on said piston;

a pentroof combustion chamber recessed in a bottom of said cylinder head and having first and second shallow-angled surfaces;

a pair of intake valves disposed in the first shallow-angled surface of said pentroof combustion chamber;

a pair of exhaust valves disposed in the second shallow-angled surface of said pentroof combustion chamber;

a pair of substantially straight intake ports, in which said pair of intake valves operate, formed in said cylinder head;

an intake-air control valve disposed in a first intake port (8a) of said pair of substantially straight intake ports for adjusting an amount of intake air passing through the first intake port;

a spark plug installed in said cylinder head in a substantially center of the cylinder;

a fuel injector disposed in the bottom of said cylinder head adjacent to said pair of intake valves so that an axial line of said fuel injector is directed to the substantially center of the cylinder, for injecting fuel directly into the cylinder; and a control unit being configured to be electronically connected to said fuel injector for switching between a homogeneous combustion mode where early fuel-injection on intake stroke produces a homogeneous air-fuel mixture while producing a tumbling action into the cylinder, and a stratified combustion mode where late fuel-injection on compression stroke produces a stratified air-fuel mixture while producing a swirling action into the cylinder;

wherein a piston crown of said piston comprises an intake-valve side inclined surface (22) generally parallel to the first shallow-angled surface (11a), an exhaust-valve side inclined surface (23) generally parallel to the second shallow-angled surface (11b), and a piston bowl (12) having a substantially round opening (12a) and arranged in an eccentric position with respect to an outside circle of an upper portion of said piston toward said pair of intake valves, and wherein said piston bowl has a deeply-recessed bowl cavity (31), and the deeply-recessed bowl cavity (31) is arranged eccentrically to the opening of the piston bowl toward a second intake port (8b) of said pair of substantially straight intake ports.

2. The in-cylinder direct-injection spark-ignition engine as claimed in claim 1, wherein the piston bowl (12) has an inside curved wall portion (32) through which a ridge line of the opening and the deeply-recessed bowl cavity are interconnected and which is smoothly continuous with the deeply-recessed bowl cavity (31).

3. The in-cylinder direct-injection spark-ignition engine as claimed in claim 2, wherein the inside curved wall portion (32) is dimensioned so that a curvature of a first inside curved surface area (33) located in a side of the first intake port (8a) is less than a curvature of a second inside curved area (34) located in a side of the second intake port (8b).

4. The in-cylinder direct-injection spark-ignition engine as claimed in claim 1, which further comprises an actuator mechanically linked to said intake-air control valve (15), and wherein said control unit being configured to be electronically connected to the actuator for automatically adjusting an opening of said intake-air control valve depending on an engine operating condition so that fuel spray injected from said fuel injector (10) is directed to the deeply-recessed bowl cavity (31).

5. The in-cylinder direct-injection spark-ignition engine as claimed in claim 1, wherein said control unit being configured to be electronically connected to said fuel injector (10) for automatically adjusting a fuel pressure of fuel spray injected from said fuel injector depending on an engine operating condition so that the fuel spray is directed to the deeply-recessed bowl cavity (31).

6. The in-cylinder direct-injection spark-ignition engine as claimed in claim 1, wherein the axial line of said fuel injector (10) is directed obliquely downwardly within towards the cylinder, and a nozzle of said fuel injector is directed within towards the piston bowl (12) when said piston is at top dead center.

7. The in-cylinder direct-injection spark-ignition engine as claimed in claim 1, wherein the intake-valve side inclined surface (22) and the exhaust-valve side inclined surface (23) are flat, and a major portion of the piston bowl (12) is recessed within the intake-valve side inclined surface (22), whereas a minor portion of the piston bowl (12) is recessed within the exhaust valve side inclined surface (23) near a ridge between the intake-valve side inclined surface (22) and the exhaust-valve side inclined surface (23).

8. The in-cylinder direct-injection spark-ignition engine as claimed in claim 7, wherein a tip of said spark plug (7) enters the piston bowl (12) in an area located near the minor portion of the piston bowl (12) when said piston is at top dead center.

9. The in-cylinder direct-injection spark-ignition engine as claimed in claim 8, wherein the deeply-recessed bowl cavity (31) is arranged coaxially with respect to an axial line of the opening (12a) of the piston bowl (12), in a piston-pin direction, so that the deeply-recessed bowl cavity (31) is formed in a direction of a stream of fuel spray injected on compression stroke.

* * * * *